3,473,255
AGRICULTURAL SOIL CONDITIONER
Kenneth C. Working, 3750 Gundry Ave.,
Long Beach, Calif. 90807
No Drawing. Filed June 5, 1967, Ser. No. 643,392
Int. Cl. A01n 7/00, 7/02
U.S. Cl. 47—58     1 Claim

ABSTRACT OF THE DISCLOSURE

A soil conditioner comprising the reaction product of an aqueous extract of quebracho and ferrous sulfate is disclosed. The conditioner can be added to the soil alone or in combination with an absorptive agent, such as, vegetable fibers.

---

An agricultural soil conditioner which, when added to the soil around a plant, will effectively break up or powder the soil so that water will effectively penetrate the soil. This soil conditioner consists essentially of quebracho extract added to an iron compound.

An object of my invention is to provide an agricultural soil conditioner which will effectively break up soils for plant raising purposes, and especially very solid or impregnable soils like clay, so that the soil becomes loose and friable and, therefore, an effective medium for plant life.

Another object of my invention is to provide a soil conditioner which contains quebracho extract preferably mixed with a metallic compound, the compound being either a chloride or sulphate.

Other objects, advantages and features of invention may appear from the subjoined detailed description and the appended claim.

I have discovered that a successful agricultural soil conditioner or addition may be prepared by absorbing a complex made by combining quebracho extract with a water soluble iron compound in the presence of water into an absorptive medium. The absorptive medium might even be dry, powdered manure, in which case the soil conditioner would be combined with a fertilizer. If desired, fowl manure in a dry state could be incorporated with my soil addition prepared from one of the mineral absorptive agents. For example, combining the quebracho extract with iron chloride or ferrous sulfate. Red quebracho is loxopterygium lorentii of the family anacardiacea. The wood or bark of the quebracho tree is first treated with water to extract the active ingredient therein, which is a derivative of orthodihydroxy benzine as near as can be determined, but I do not wish to be held to this formula or chemical element. The extract from the wood is then put in a burlap sack and permitted to drain. The solid residue hardens to an amorphous mass, which can be ground to a dry powder. When the reaction between the quebracho and the iron compound is completed, the resultant complex is no longer brown or green but black in color. The reaction may be augmented by the presence of a calcium, sodium, potassium, or ammonium compound or ammonia gas; for example, the nitrates of these substances. Calcium nitrate is usually preferable, alone or with a minor content of ammonium nitrate, such as is commonly sold as agricultural calcium nitrate. The calcium nitrate has the advantage of the tendency of the calcium ion to take up the sulfate radical released by the ferrous sulfate, resulting in a less water soluble compound which enhances the reaction when the iron compound is ferrous sulfate. In general sodium and chlorides are less desirable than are sulfates, although sodium nitrate and iron chloride may be used, and when mixed with calcium nitrate they are quite satisfactory. The same is true of potassium and ammonium nitrates. Ferrous sulfate of the quality designated as copperas has been found entirely satisfactory. The most satisfactory product is recited in Example 1 following, and where the iron compound is ferrous sulfate.

The absorptive medium may be a mineral such as pumice, or popped and ground perlite. Perlite is a naturally occurring mineral. It is fed into a rotary kiln and subjected to a temperature of 1450° F., which expands it like popcorn. The product is then cooled to room temperature. This product, of very low bulk density and extreme porosity, is crushed to desired size, and much of it is in the form of a powder, which is desirable for the present purposes. Again the absorptive medium may be mill sawdust, or chips from the wood of pine, spruce, oak, maple, beech or many other woods. Again it may be from the ground stems of plants, such as straw, flax shive, bagasse, or other similar materials. In some cases I have found it preferable to introduce the iron compound and the quebracho extract directly into water and then to mix this water solution or dispersion into the absorptive medium, mixing it thoroughly and homogeneously throughout the absorptive medium.

Under certain circumstances, and in the case of certain soils, I have found it preferable to introduce my iron-quebracho complex directly into the soil, in the form of a water solution or dispersion, allowing it to become absorbed directly by the soil, without first absorbing it into an absorptive medium, the soil being per se the absorptive medium. The absorptive medium is preferably in the form of a dry, coarse or fine powder. The water used may be at any temperature from the freezing point to the boiling point, or wet steam may also be used. The colder the water, the slower the reaction. If cold water be used, the absorbed mass must be stockpiled for several hours, or even days. If hot water be used, the product is ready for use as soon as it has cooled to room temperature.

The proportion of ferrous sulfate to quebracho extract is relatively unimportant. I have used one part by weight of each, to one part of copperas to 8 parts of quebracho. As soon as the reaction is completed, the pale colored or white mixture has become black, it is ready for use. The exact proportion of calcium nitrate is also unimportant, but it should be sufficient to prevent nitrogen drawdown from the soil, if an organic absorbent medium is used.

The main object of my soil conditioner is to loosen compacted soil, rendering it porous and water absorptive and to encourage the roots of plants to avail themselves of any fertilizer present in the soil, and it is not intended as a fertilizer of itself.

Following are examples of the preparation of the object of this invention:

Example 1

The following was mixed and comminuted:

|  | Grams |
|---|---|
| Quebracho extract | 49 |
| Ferrous sulfate (copperas) | 16 |
| Calcium nitrate (agricultural grade) | 100 |

This mixture is thoroughly incorporated into:

Dry pine sawdust: 896 grams

When homogeneously mixed, 1912 milliliters of water at 200° F., is intimately stirred into the dry mixture until the mass is uniformly wet. This is allowed to stand in a container until it has dropped to ambient temperature.

Example 2

The same was repeated, except that the quebracho extract was reduced to 25 grams.

Example 3

The same was repeated, except that popped perlite powder of a like weight was substituted for the pine sawdust, and the calcium nitrate was eliminated.

Examples of the use of these soil conditioners follow:

Relatively sterile soil, predominantly clay, was obtained from the bottom of an excavation 30 feet deep. Two 46 ounce cans were filled with this soil. Two more 46 ounce cans were filled with this soil, mixed with ½ its volume of pine sawdust. Two more of these cans were filled with this soil, mixed with ½ its volume of the preparation described in Example 1 supra, and two more of these cans were filled with this soil mixed with ½ its volume of the material described in Example 2 supra. Rye seeds were planted in each of these cans, the same number of seeds by count in each can, all taken from the same package of seeds. These cans were placed side by side outdoors, where they were subjected to the same conditions of sunlight, wind, temperature, etc. The same quantity of water from the same source was sprinkled into each can each day. At the same time that sprouts appeared on the untreated soil, and the soil prepared with the products of Examples 1 and 2 supra, no sprouts appeared on the soil mixed with plain pine sawdust. No sprouts ever appeared thereon. In a few days the sprouts on the unchanged soil wilted and died. The water sprinkled onto the soil per se, and the soil with plain pine sawdust remained on top until it evaporated, whereas the water sprinkled onto the soil of additions 1 and 2 soaked up into the soil. Finally all of the cans were emptied. The soil per se, and the soil with plain sawdust was difficult to remove from the cans requiring a pick to break up the bricklike soil. The cans wherein the soil was mixed with treated sawdust were very easily emptied and found to contain loose, moist soil throughout, and to be interpenetrated throughout with a rank growth of roots of rye. The rye grown in these samples of treated soil was robust and healthy looking.

Rosebushes, lawn grass, nasturtiums, ornamental shrubs and young ornamental trees were furnished with conditioner as per Examples 1 and 2 supra. In comparison with similar plants deprived of these additions, those with, were of superior quality of leaves, flowers, and rate of growth to those without the presence of such material.

Garden plants grown in soil in which I incorporated material prepared in accordance with Example 3 supra, were more robust, bright flowered, and of faster growth than those of similar varieties grown in soil similar, except lacking in my soil conditioner. I also found that the soil treated with this conditioner of Example 3 supra became looser, and more absorptive of water than the soil in the same garden not treated therewith.

Having described by invention, I claim:
1. An agricultural soil conditioner comprising the reaction product of an aqueous extract of quebracho and ferrous sulfate wherein the ratio of ferrous sulfate to the extract is in the range of 1:1 to 1:8.

References Cited
UNITED STATES PATENTS

| | | | |
|---|---|---|---|
| 2,741,876 | 4/1956 | Paoloni | 71—63 X |
| 2,838,877 | 6/1958 | Working | 71—23 X |

S. LEON BASHORE, Primary Examiner

R. D. BAJEFSKY, Assistant Examiner

U.S. Cl. X.R.

71—1, 23